| United States Patent [19] | [11] Patent Number: 4,939,219 |
|---|---|
| Terashima et al. | [45] Date of Patent: Jul. 3, 1990 |

[54] COATING COMPOSITIONS FOR PREVENTING ADHESION OF AQUATIC ORGANISMS

[75] Inventors: Hirokazu Terashima, Odawara; Osamu Isozaki, Yokohama, both of Japan

[73] Assignee: Kansai Paint Company, Limited, Amagasaki, Japan

[21] Appl. No.: 302,659

[22] Filed: Jan. 27, 1989

[30] Foreign Application Priority Data

Feb. 1, 1988 [JP] Japan ................................. 63-21751

[51] Int. Cl.$^5$ .............................................. C08F 20/16
[52] U.S. Cl. ................................................... 526/292.5
[58] Field of Search ...................................... 526/292.5

[56] References Cited
FOREIGN PATENT DOCUMENTS 826831  1/1960  United Kingdom ............. 526/292.5

*Primary Examiner*—Joseph L. Schofer
*Assistant Examiner*—Alex H. Walker
*Attorney, Agent, or Firm*—Armstrong, Nikaido, Marmelstein, Kubovcik & Murray

[57] ABSTRACT

Disclosed is a coating composition for preventing adhesion of aquatic organisms, the composition containing as a vehicle component a copolymer prepared by copolymerizing about 5 to about 85% by weight of (A) a monohydric and/or polyhydric phenol ester of acrylic or methacrylic acid; about 15 to about 75% by weight of (B) an ethylenically unsaturated monomer having a soluble parameter of about 8.0 to about 9.5 and a glass transition temperature of about 0° C. or higher; and about 0 to about 50% by weight of (C) a water-soluble, ethylenically unsaturated monomer containing carboxyl group or amino group, based on the total monomer components.

8 Claims, No Drawings

COATING COMPOSITIONS FOR PREVENTING ADHESION OF AQUATIC ORGANISMS

The present invention relates to coating compositions for preventing adhesion of aquatic organisms which compositions give coats capable of exhibiting the property of preventing adhesion of aquatic organisms for a prolonged period of time.

Heretofore coating compositions for preventing adhesion of aquatic organisms have been generally applied to the submersible parts of a vessel or an offshore structure to preclude corrosion or decrease of the vessel's cruising speed which would be caused by underwater organisms clinging thereto such as barnacles, bryozoans, ascidians, algae or the like or to keep fishes or shellfishes from being lethally affected by aquatic organisms attached on nets or wire nettings for aquatic cultivation. These coating compositions for preventing adhesion of aquatic organisms include those comprising an anti-adhesion agent and vehicle components such as a toughener, rosin, plasticizer and the like and those comprising a homopolymer or a copolymer of an organotin-containing unsaturated monomer as disclosed in, for example, Japanese Examined Patent Publications Nos. 21,426/1965; 9,579/1969; 12,049/1976; etc.

The former type of coating compositions can produce a coat which can achieve the effect of preventing adhesion of aquatic organisms (hereinafter referred to as "aquatic-adhesion preventing effect") by causing the rosin and anti-adhesion agent contained therein to dissolve out. However, said coat is given an uneven surface due to the increase in the proportions of insoluble components in the coat during a long-term submersion in seawater, thereby providing a lower degree of aquatic-adhesion reventing effect. On the other hand, the latter type of coating compositions have the following problem. The submersion in seawater of coat formed from this type of coating composition induces the hydrolysis of an ester linkage. Due to the hydrolysis, the organotin compound introduced into the polymer through the ester linkage is separated from the coat and a carboxyl-containing polymer is produced and dissolved out in seawater, whereby the coat is imparted a freshly exposed surface all the time and is allowed to sustain the aquatic-adhesion preventing effect. Yet this type of coating composition is defective in adversely affecting fish and shellfish because the composition generally contains a large amount of harmful organotin compound exhibiting a high degree of the property of preventing adhesion of aquatic organisms (hereinafter referred to as "aquatic-adhesion preventing property").

An object of the present invention is to provide a coating composition giving a coat which is capable of exhibiting an aquatic-adhesion preventing property for a long term and which has a low toxicity.

Other objects and features of this invention will become more apparent from the following description.

The invention provides a coating composition for preventing adhesion of aquatic organisms, the composition containing as a vehicle component a copolymer prepared by copolymerizing about 5 to about 85% by weight of (A) a monohydric and/or pollyhydric phenol ester of acrylic or methacrylic acid; about 15 to about 75% by weight of (B) an ethylenically unsaturated monomer having a soluble parameter of about 0.8 to about 9.5 and a glass transition temperature of about 0° C. or higher; and about 0 to about 50% by weight of (C) a water-soluble, ethylenically unsaturated monomercontaining carboxyl group or amino group, based on the total monomer components.

The coating composition of the invention contains as a vehicle component the copolymer prepared using a specific amount of the monohydric and/or polyhydric phenol ester of acrylic or methacrylic acid (monomer (A)) as one of monomer components. When submersed, the coat formed from the coating composition of the invention causes the structural unit derived from the monomer (A) to gradually hydrolyze, whereby a monohydric and/or polyhydric phenol compound having a bactericidal action is released to achieve the aquatic-adhesion preventing effect (antifouling effect). The phenol compound to be released has a low toxicity itself, and is reliable in the safety of human body.

Described below are the monomer components used for preparing of the copolymer contained as the vehicle component in the coating composition of the invention.

Examples of the monohydric and/or polyhydric phenol ester of acrylic or methacrylic acid (monomer (A)) include monohydric and/or polyhydric phenol esters of acrylic or methacrylic acids represented by the formula

and polyhydric phenol esters of acrylic or methacrylic acids represented by the formula

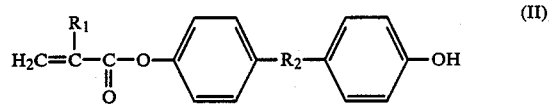

In the formulas (I) and (II), $R_1$ is a hydrogen atom or methyl group, and the hydrogen atom on the aromatic ring may be unsubstituted or may partly or wholly substituted with halogen atom, hydroxyl group, nitro group, amino group, cyano group, sulfonic acid group, alkyl group or alkoxy group. $R_2$ in the formula (II) is alkylene group, —O—, —CH$_2$O—, —CH$_2$OCH$_2$—, —SO$_2$— or the like.

Examples of the halogen atoms in the formulas (I) and (II) are chlorine, bromine, fluorine and the like among which chlorine is suitable. Illustrative of the alkyl groups in these formulas are those having preferably 1 to 6 carbon atoms, more preferably 1 to 4 carbon atoms, such as methyl, ethyl, propyl, butyl, pentyl, heptyl and the like. Representative alkoxy groups are those having preferably 1 to 6 carbon atoms, more preferably 1 to 4 carbon atoms, such as methoxy, ethoxy, propoxy, butoxy, pentoxy, octyloxy, etc. The alkylene groups are those represented by the formula $-(C_nH_{2n})-$ wherein n is an integer of 1 to 5. Exemplary of the alkylene groups are

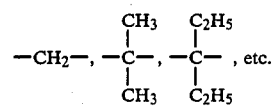

Preferred examples of the monomer (A) represented by the formula (I) or (II) are phenyl acrylate or methacrylate, o-chlorophenyl acrylate or methacrylate, m-chlorophenyl acrylate or methacrylate, p-chlorophenyl acrylate or methacrylate, 2,4,6-trichlorophenyl acrylate or methacrylate, pentachlorophenyl acrylate or methacrylate, o-methylphenyl acrylate or methacrylate, m-methylphenyl acrylate or methacrylate, p-methylphenyl acrylate or methacrylate, p-tert-butyl phenyl acrylate or methacrylate, o-methoxyphenyl acrylate or methacrylate, m-methoxyphenyl acrylate or methacrylate, p-ethoxyphenyl acrylate or methacrylate, o-nitrophenyl acrylate or methacrylate, m-nitrophenyl acrylate or metnacrylate, p-nitrophenyl acrylate or methacrylate, 2,4-dinitrophenyl acrylate or methacrylate, dimethylaminophenyl acrylate or methacrylate, p-cyanophenyl acrylate or metnacrylate, phenylsulfonic acid acrylate or methacrylate, p-hydroxyphenyl acrylate or methacrylate,

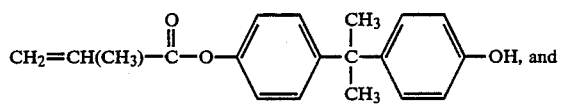

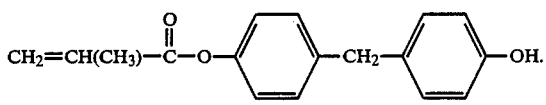

The monomers (A) are usable singly or at least two of them can be used in mixture. Preferable of the above examples are the phenol esters of acrylic or methacrylic acids of the formula (I) which are lower in toxicity and outstanding in aquatic-adhesion preventing property and hydrolytic property. Among them, more preferred are phenyl acrylate or methacrylate, o, m or p-chlorophenyl acrylate or methacrylate, tricnlorophenyl acrylate or methacrylate, o, m or p-methylpnenyl acrylate or methacrylate, p-tert-butylphenyl acrylate or methacrylate, etc.

The amount of the monomer (A) used is about 5 to about 85% by weight, preferably about 30 to about 70% by weight, based on the total monomer components. Less than 5% by weight of the monomer (A) used reduces the amount of monohydric and/or polyhydric phenol compound produced by the hydrolysis and also decreases the number of carboxyl group produced by the hydrolysis, making it impossible to achieve a long-term aquatic-adhesion preventing effect. More than 85% by weight of the monomer (A) used accelerates the dissolution of the coat in water, rendering the coat unable to afford a sustained aquatic-adhesion preventing effect.

The ethylenically unsaturated monomer (monomer (B)) is used to provide better release, into water or seawater, of phenol component produced by the hydrolysis of the structural unit derived from the phenol ester of acrylic or methacrylic acid (A). Useful monomers (B) are those having a soluble parameter (SP value) of about 8.0 to about 9.5, preferably about 8.2 to about 9.4 and a glass transition temperature (Tg) of about 0° C. or higher, preferably about 10° to about 150° C.

The term "soluble parameter" used herein is the terminology which is found in J. Paint Tech., 42 [541], p 176, February, 1970 and also in Polymer Hand Book, 2nd edition.

The monomer (B) is used in an amount of about 15 to about 75% by weight, preferably about 30 to about 70% by weight, based on the total monomer components to obtain the copolymer. Use of the copolymer serves to produce a coat well balanced in the hydrophilic property and the hardness. On submersion in water or seawater, the coat well balanced in these properties will be swollen with the water permeated deep into the coat. The hydrolysis of the structural unit derived from the monomer (A), which is initiated in this state, proceeds uniformly in the interior as well as at the surface of the coat so that the phenol component can be dissolved out at an even rate until the coat is depleted into extinction. Use of the monomer (B) less than about 8.0 in the soluble parameter lowers the hydrophilic property of coat, whereas use of the monomer (B) more than about 9.5 in the parameter enhances the hydrophilic property to an excessive extent, accelerating the dissolution of coat and rendering the coat unable to sustain the aquatic-adhesion preventing effect for a long time. Use of the monomer (B) of Tg lower than about 0° C. renders it difficult tor water or seawater to permeate into the coat which as a result fails to fully exhibit the aquatic-adhesion preventing property. Less than about 15% by weight of the monomer (B) used reduces the mechanical strength and durability of coat, hence undesirable. More than about 75% by weight of the monomer (B) used is also undesirable because of failure to fully produce the aquatic-adhesion preventing effect.

Preferred examples of the ethylenically unsaturated monomer (B) which can be used in the invention are methyl methacrylate, ethyl methacrylate, n-butyl methacrylate, iso-butyl methacrylate, t-butyl methacrylate and like $C_1$–$C_4$ alkyl esters of methacrylic acids; methyl acrylate, t-butyl acrylate and like esters of acrylic acids; vinyl toluene, $\alpha$-methylstyrene, styrene and like aromatic vinyl monomers; etc.

Use of smaller amount of the monomer (A) reduces the number of carboxyl group produced by the hydrolysis of structural unit derived from the monomer (A), leading to the tendency for the coat to become gradually insoluble in water and to fail to display a high aquatic-adhesion preventing effect for a long term. In view of this tendency, the ethylenically unsaturated monomer containing carboxyl group or amino group (monomer (C)) is a water-soluble monomer which is used, when required, to provide the coat with a proper degree of water solubility or a swelling property.

The monomer (C) can be any of monomers which serves to impart the water solubility to the copolymer. Suitable examples of the monomer (C) are carboxyl-containing ethylenically unsaturated monomers which are easily neutralized with the basic substance in seawater and rendered water-soluble, and tertiary amino-containing ethylenically unsaturated monomers which per se are excellent in water solubility. Examples of the carboxyl-containing ethylenically unsaturated monomers are acrylic or methacrylic acid, maleic acid, maleic annydride, itaconic acid, fumaric acid, $\alpha$-chloroacrylic acid, citraconic acid, etc. Examples of the tertiary amino-containing ethylenically unsaturated monomers are N,N-dimethylaminoethyl acrylate or methacrylate, N,N-diethylaminoethyl acrylate or methacrylate, 1-vinyl-2-pyrrolidone, 1-vinyl-3-pyrrolidone, 2-vinyl pyridine, N,N-dimethyl acrylamide or methacrylamide, N,N-dimethylaminopropyl acrylamide or methacrylamide, etc.

The amount of the carboxyl- or amino-containing ethylenically unsaturated monomer (C) used is 0 to about 50% by weight, preferably about 5 to about 20% by weight, based on the total monomer components. More than about 50% by weight of the monomer (C) used affords an excessive degree of water solubility to the coat, rendering the coat unable to sustain an aquatic-adhesion preventing effect.

If necessary, other radically copolymerizable ethylenically unsaturated monomer (monomer (D)) than the unsaturated monomers (A), (B) and (C) can be used according to the required properties of coat. Examples of the monomer (D) are ethyl acrylate, n-butyl acrylate, 2-ethylhexyl acrylate, 2-ethylhexyl methacrylate, lauryl methacrylate, stearyl methacrylate, acrylonitrile, methacrylonitrile, 2-hydroxyethyl acrylate, 2-hydroxypropyl acrylate, etc. The amount to the monomer (D) used is about 50% by weight or less, preferably about 15% by weight or less, based on the total monomer components.

Given below are examples of combinations of monomer components used for preparation of the copolymer according to the invention:

(1) about 25 to about 85% by weight of the monomer (A) and about 15 to about 75% by weight of the monomer (B);

(2) about 5 to about 85% by weight of the monomer (A), about 15 to about 75% by weight of the monomer (B) and about 10 to about 50% by weight of the monomer (C);

(3) about 5 to about 85% by weight of the monomer (A), about 15 to about 75% by weight of the monomer (B) and about 10 to about 50% by weight of the monomer (D); and (4) about 5 to about 85% by weight of the monomer (A), about 15 to about 75% by weight of the monomer (B), about 5 to about 50% by weight of the monomer (C) and about 5 to about 50% by weight of the monomer (D).

The copolymer for use as the vehicle component in the coating composition of the invention can be prepared by known processes, for example, by reacting the monomer components in an inactive organic solvent in the presence of a radical polymerization catalyst at a temperature of about 0° to about 180° C., preferably about 40° to about 170° C. for about 1 to about 20 hours, preferably about 6 to about 10 hours.

The kind of organic solvent used is not critical insofar as the solvent is capable of dissolving the produced copolymer without gelation during the copolymerization reaction. Examples of useful organic solvents are ethanol, propanol, butanol, benzyl alcohol and like alcohols; cellosolve, ethyl cellosolve, carbitol, butyl carbitol, ethylene glycol dimethyl ether, ethylene, glycol monoacetate and like ethers; toluene, xylene and like aromatic hydrocarbons; ethyl acetate, butyl acetate and like esters; cyclohexanone, methyl isobutyl ketone and like ketones; etc.

Usable as the radical polymerization catalyst are radical polymerization initiators commonly used for radical polymerization, e.g. azo-type compounds, peroxide-type compounds, diazo compounds, nitroso compounds, redox-type compounds and like catalysts. Optionally the radical polymerization may be initiated with ionizing radiation or other means.

The copolymer for use in the invention is one having a number-average molecular weight of about 3,000 to about 200,000, preferably about 5,000 to about 50,000. Use of the copolymer less than about 3,000 in number-average molecular weight enhances the hydrophilic property to an excessive extent and decreases a long-term aquatic-adhesion preventing property, whereas use thereof with more than about 200,000 in the number-average molecular weight retards the dissolution of coat owing to the difficulty of hydrolysis in seawater or the like, leading to inability of coat to exhibit an aquatic-adhesion preventing property.

Copolymers useful in the invention include those prepared by other processes than the foregoing one, for example, a copolymer prepared by reacting a phenol or a compound

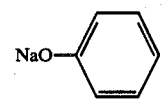

with a copolymer prepared using $CH_2=CHCOOH$ or $CH_2=CHCOCl$ as a monomer. However, it is preferred to use the copolymer prepared by the process hereinbefore described which is easy to carry out with little or no side reaction involved.

The coating compositions for preventing adhesion of aquatic organisms according to the invention contains as a vehicle component the copolymer having the foregoing structure. The coat formed from the coating composition of the invention is gradually dissolved out in water or seawater, releasing the bactericidal phenol compound produced by hydrolysis in water or seawater. Therefore the coat is capable of affording an excellent aquatic-adhesion preventing effect.

The coating composition contains the copolymer in an amount of about 10 to about 70% by weight, preferably about 20 to about 50% by weight. Useful as the solvent for preparation of the coating composition according to the invention are the examples of solvents shown above for preparation of the copolymer.

The coating composition of the invention may contain a known antifouling agent according to the required properties, such as cuprous oxide, copper thiocyanate, copper powder or like copper-type antifouling agents, triphenyltin fluoride, triphenyltin chloride, tributyltin oxide or like organotin antifouling agents, zinc ethylene-bis (dithiocarbamate), tetramethylthiuram disulfide or like nitrogen-containing sulfur-type antifouling agents, zinc oxide or the like. The amount of conventional antifouling agent for use is determined according to the required properties of the coat so that the agent does not adversely affect the properties of the coating compositions of the invention.

The coating composition may further contain an extender pigment, coloring pigment, plasticizer, additives for coating, other resins and the like, when so required. The extender pigment and coloring pigment can be used in the total amount of about 500 parts by weight or less per 100 parts by weight as the total amount of the above-mentioned copolymer, plasticizer, additives for coating and other resins. The total amount of the plasticizer, additives for coating and other resins is about 100 parts by weight or less per 100 parts by weight of the copolymer.

For formation of a coat, the coating composition of the present invention is applied directly to the surface of a substrate or to the surface of a coated substrate. Exemplary of the substrates for use are offshore structures and the like including vessels, harbor facilities, buoys, pipelines, bridges, undersea bases, nets for aquatic cultivation, stationary nets for fishing, etc. Representative coated substrates are substrates covered with: a single-layer coat formed by application of one of a wash primer, zinc epoxy type shop primer and like primers, oily anticorrosion type, rubber chloride type, epoxy type and like undercoat primers and long-oil phthalic resin type, rubber chloride type, epoxy type and like intercoat or topcoat compositions; or a multi-layer coat formed by applications of a primer and an undercoat primer; or a multi-layer coat formed by sequential applications of a primer, undercoat primer, and intercoat or topcoat composition. The application can be conducted by brushing, spraying, roller coating, immersion or like means. The coating composition is applied in an amount sufficient to form a layer having a thickness of about 40 to about 500 μm, preferably about 80 to about 300 μm, when dried. Subsequently the layer thus applied is dried to provide a coat having an auqatic-adhesion preventing property. Heating is not required for drying since the layer is dried when left to stand at room temperature, i.e. at about −10° to about 40° C., for about 4 to about 24 hours.

The coat thus formed retains an outstanding aquatic-adhesion preventing property over a prolonged period of time, and is pronouncedly high in safety toward the human body.

The present invention will be described below in greater detail with reference to the following Preparation Examples, Comparison Examples and Examples.

PREPARATION EXAMPLE 1

Preparation of copolymer I

Phenyl acrylate (50 g), 50 g of methyl methacrylate, 43 g of xylene and 2.0 g of benzoyl peroxide were mixed together. The mixture was reacted with stirring at 90° to 100° C. for 3 hours. To the reaction mixture were added 1.0 g of benzoyl peroxide and 107 g of xylene. The mixture was reacted with stirring at 90° to 100° C. for 2 hours, giving a pale yellow viscous liquid having a solids content of 40% by weight. The thus obtained copolymer (copolymer I) had a number-average molecular weight of 23,000.

PREPARATION EXAMPLE 2

Preparation of copolymer II

Styrene (30 g), 30 g of ethyl methacrylate, 40 g of o-chlorophenyl methacrylate, 43 g of xylene and 0.5 g of azobisisobutyronitrile were mixed together. The mixture was reacted with stirring at 90° to 100° C. for 3 hours. To the reaction mixture were added 1.0 g of azobisisobutyronitrile and 107 g of xylene. The mixture was reacted with stirring at 90° to 100° C. for 2 hours, giving a pale yellow viscous liquid having a solids content of 40% by weight. The thus obtained copolymer (copolymer II) had a number-average molecular weight of 45,000.

PREPARATION EXAMPLE 3

Preparation of copolymer III

A 60 g quantity of p-t-butylphenyl acrylate, 30 g of methyl methacrylate, 10 g of n-butyl methacrylate, 43 g of xylene and 1.0 g of benzoyl peroxide were mixed together. The mixture was reacted with stirring at 90° to 100° C. for 3 hours. To the reaction mixture were added 1.0 g of benzoyl peroxide and 107 g of xylene. The mixture was reacted with stirring at 90° to 100° C. for 2 hours, giving a pale yellow viscous liquid having a solids content of 40% by weight. The thus obtained copolymer (copolymer III) had a number-average molecular weight of 36,000.

PREPARATION EXAMPLE 4

Preparation of copolymer IV

A 50 g quantity of o,p-trichlorophenyl acrylate, 30 g of methyl methacrylate, 20 g of 2-ethylhexyl methacrylate, 43 g of xylene and 2.5 g of azobisisobutyronitrile were mixed together. The mixture was reacted with stirring at 90° to 100° C. for 3 hours. To the reaction mixture were added 1.0 g of azobisisobutyronitrile and 107 g of xylene. The mixture was reacted with stirring at 90° to 100° C. for 2 hours, giving a pale yellow viscous liquid having a solids content of 40% by weight. The thus obtained copolymer (copolymer IV) had a number-average molecular weight of 18,000.

PREPARATION EXAMPLE 5

Preparation of copolymer V

A 30 g quantity of p-nitrophenyl acrylate, 30 g of phenyl methacrylate, 40 g of styrene, 43 g of xylene and 0.8 g of benzoyl peroxide were mixed together. The mixture was reacted with stirring at 90° to 100° C. for 3 hours. To the reaction mixture were added 1.0 g of benzoyl peroxide and 107 g of xylene. The mixture was reacted with stirring at 90° to 100° C. for 2 hours, giving a pale yellow viscous liquid having a solids content of 40% by weight. The thus obtained copolymer (copolymer V) had a number-average molecular weight of 40,000.

PREPARATION EXAMPLE 6

Preparation of copolymer VI

A copolymer was produced in the same manner as in Preparation Example 1 with the exception of using n-butanol in place of xylene as a solvent and using the following monomer mixture:

p-t-Butylphenyl methacrylate: 30 g
Methyl methacrylate: 50 g
Acrylic acid: 10 g
Ethyl acrylate: 10 g
Azobisisobutyronitrile: 2.5 g A pale yellow viscous liquid was obtained which contained a copolymer (copolymer VI) and which had a solids content of 40% by weight. The copolymer had a number-average molecular weight of 20,000.

PREPARATION EXAMPLE 7

Preparation of copolymer VII

A copolymer was produced in the same manner as in Preparation Example 6 with the exception of using the following monomer mixture.

Phenyl methacrylate: 30 g
iso-Butyl methacrylate: 35 g
Methyl methacrylate: 20 g
Methacrylic acid: 15 g
Azobisisobutyronitrile: 0.5 g A pale yellow viscous liquid was obtained which contained a copolymer (copolymer VII) and which had a solids content of 40% by weight. The copolymer had a number-average molecular weight of 40,000.

EXAMPLE 1

A coating composition for preventing adhesion of aquatic organisms was prepared by mixing and dispersing 70.0 g of the solution of the copolymer I prepared above in Preparation Example 1 (solids content of 40% by weight), 5.0 g of talc, 3.0 g of red iron oxide, 0.5 g of Aerosil #200 (product of Degussa, West Germany), 10 g of cuprous oxide and 11.5 g of xylene with a paint conditioner.

EXAMPLES 2 TO 11

A coating compositions for preventing adhesion of aquatic organisms were prepared by carrying out the same procedure as done in Example 1 using each mixture shown below in Table 1 in the amount listed therein. The values in the table are in terms of gram.

COMPARISON EXAMPLES 1 TO 3

A coating compositions for preventing adhesion of aquatic organisms were each prepared from the following mixture in the same manner as in Example 1.

Comparison Example 1

| | |
|---|---|
| Vinyl chloride resin | 10.0 (g) |
| Rosin | 10.0 |
| Tricresyl phosphate | 4.0 |
| Triphenyltin fluoride | 10.0 |
| Talc | 5.0 |
| Red iron oxide | 5.0 |
| Xylol | 28.0 |
| Methyl isobutyl ketone | 28.0 |
| Total | 100.0 (g) |

Comparison Example 2

| | |
|---|---|
| Rubber chloride resin | 5.0 (g) |
| Rosin | 15.0 |
| Tricresyl phosphate | 4.0 |
| Cuprous oxide | 30.0 |
| Talc | 5.0 |
| Barium sulfate | 3.0 |
| Red iron oxide | 4.0 |
| Xylol | 34.0 |
| Total | 100.0 (g) |

Comparison Example 3

| | |
|---|---|
| Vinyl chloride resin | 5.5 (g) |
| Rosin | 5.5 |
| Tricresyl phosphate | 2.0 |
| Cuprous oxide | 30.0 |
| Triphenyltin hydrooxide | 10.0 |
| Barium sulfate | 4.0 |
| Talc | 11.0 |
| Red iron oxide | 10.0 |
| Xylol | 11.0 |
| Methyl isobutyl ketone | 11.0 |
| Total | 100.0 (g) |

The coating compositions for preventing adhesion of aquatic organisms which compositions were obtained in Examples 1 to 11 and in Comparison Examples 1 to 3 were tested for the aquatic-adhesion preventing property with the results as shown below in Table 2.

Test for aquatic-adhesion preventing property

The coating compositions obtained in Examples 1 to 11 and in Comparison Examples 1 to 3 were each applied to a sandblasted steel plate covered with a first layer of a zinc epoxy type shop primer (with a thickness of 15 μm when dried) and a second layer of epoxy type anticorrosion coating composition (with a thickness of 200 μm when dried) to form a coat of 100 μm thickness when dried. The coated plate was dried for 7 days to provide a test plate. The test plates were immersed in Toba Bay, Mie Prefecture, Japan to determine the aquatic-adhesion preventing property (the area of the test plate on which the aquatic organisms were attached was expressed in percentage). Table 2 below shows the results.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Solution of copolymer I | 70 | 80 | | | | | | 80 | 60 | | |
| Solution of copolymer II | | | 70 | 80 | | | | | | 50 | |
| Solution of copolymer III | | | | | 80 | | | | | | 50 |
| Solution of copolymer IV | | | | | | 80 | 60 | | | | |
| Talc | 5 | | 5 | | 5 | | | | | 10 | 5 |
| Red iron oxide | 3 | | 3 | | 3 | | | | | 15 | 15 |
| Aerosil #200 | 0.5 | 1.0 | 0.5 | 1.0 | 1.0 | 1.0 | 0.5 | 1.0 | 0.5 | 0.5 | 0.5 |
| Cuprous oxide | 10 | | | | | | 10 | | 10 | | 15 |
| Zinc ethylene-bis (dithiocarbamate) | | | 5 | | | | 5 | | 5 | 10 | |
| Xylene | 11.5 | 19.0 | 6.5 | 19.0 | 11.0 | 19.0 | 24.5 | 19.0 | 24.5 | 14.5 | 14.5 |
| Total amount | 100.0 | 100.0 | 100.0 | 100.0 | 100.0 | 100.0 | 100.0 | 100.0 | 100.0 | 100.0 | 100.0 |

TABLE 2

| | Term of Immersion (month) | | |
|---|---|---|---|
| | 6 | 12 | 18 |
| Example | | | |
| 1 | 0 | 0 | 0 |
| 2 | 0 | 0 | 5 |
| 3 | 0 | 0 | 5 |
| 4 | 0 | 0 | 10 |
| 5 | 0 | 0 | 0 |
| 6 | 0 | 0 | 10 |
| 7 | 0 | 0 | 5 |
| 8 | 0 | 0 | 5 |
| 9 | 0 | 0 | 0 |
| 10 | 0 | 0 | 0 |
| 11 | 0 | 0 | 0 |
| Comp. Example | | | |
| 1 | 0 | 10 | 30 |
| 2 | 0 | 0 | 15 |
| 3 | 0 | 0 | 0 |

The test results show that the tested coating compositions of the invention exhibited a high aquatic-adhesion preventing property. On the other hand, the coating compositions prepared in Comparison Examples 1 and 2 are poor in the long-term aquatic-adhesion preventing property and the coating composition prepared in Comparison Example 3 had the drawback of being significantly harmful because of the presence of the organotin compound although good in the aquatic-adhesion preventing property.

We claim:

1. A coating composition for preventing adhesion of aquatic organisms to submersible substrates, comprising an organic solent and a copolymer prepared by copolymerizing about 5 to about 85% by weight of (A) a monohydric and/or polyhydric phenol ester of acrylic or methacryic acid; about 15 to about 75% by weight of (B) an ethylenically unsaturated monomer having a soluble parameter of about 8.0 to about 9.5 and a glass transition temperature of about 0° C. or higher; and about 5 to about 50% by weight of (C) a water-soluble, ethylenically unsaturated monomer containing a carboxyl group or amino group, based on the total monomer components.

2. A coating composition according to claim 1 wherein the monohydric and/or polyhydric phenol ester of acrylic or methacrylic acid (A) is at least one member selected from the group consisting of phenyl acrylate or methaorylate, o-chlorophenyl acrylate or methacrylate, m-chlorophenyl acrylate or methacrylate, p-chlorophenyl acrylate or methacrylate, 2,4,6-trichlorophenyl acrylate or methacrylate, pentachlorophenyl acrylate or methacrylate, o-methylphenyl acrylate or methacrylate, m-methylphenyl acrylate or methacrylate, p-methylphenyl acrylate or methacrylate, p-tert-butyl phenyl acrylate or methacrylate, o-methoxyphenyl acrylate or methacrylate, m-methoxyphenyl acrylate or methacrylate, p-ethoxyphenyl acrylate or methacrylate, o-nitrophenyl acrylate or methacrylate, m-nitrophenyl acrylate or methacrylate, p-nitrophenyl acrylate or methacrylate, 2,4-dinitrophenyl acrylate or methacrylate, dimethylaminophenyl acrylate or methacrylate, p-cyanophenyl acrylate or methacrylate, phenylsulfonic acid acrylate or methacrylate, p-hydroxyphenyl acrylate or methacrylate,

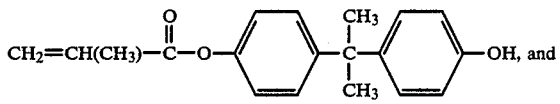

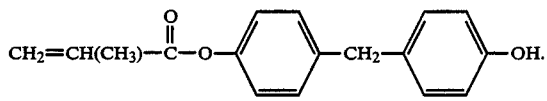

3. A coating composition according to claim 1 wherein the ethylenically unsaturated monomer (B) is at least one member selected from the group consisting of methyl methacrylate, ethyl methacrylate, n-butyl methacrylate, iso-butyl methacrylate, t-butyl methacrylate, methyl acrylate, t-butyl acrylate, vinyl toluene, α-methylstyrene and styrene.

4. A coating composition according to claim 1 wherein the carboxyl- or amino-containing, water-soluble, ethylenically unsaturated monome (C) is at least one member selected from the group consisting of acrylic or methacrylic acid, maleic acid, maleic anhydride, itaconic acid, fumaric acid, α-chloroacrylic acid, citraconic acid, N,N-dimethylaminoethyl acrylate or methacrylate, N,N-diethylaminoethyl acrtylate or methacrylate, 1-vinyl-2-pyrrolidone, 1-vinyl-3-pyrrolidone, 2-vinyl pyridine, N,N-dimethyl acrylamide or methacrylamide and N,N-dimethylaminopropyl acrylamide or methacrylamide.

5. A coating composition according to claim 1 wherein the copolymer is one prepared by copolymerizing the monomer mixture consisting of about 5 to about 85% by weight of the phenol ester of acrylic or methacrylic acid (A), about 15 to about 75% by weight of the ethylenically unsaturated monomer (B), about 5 to about 50% by weight of the carboxyl- or amino-containing ethylenically unsaturated monomer (C) and about 5 to about 50% by weight of a radically polymerizable ethylenically unsaturated monomer other than the monomers (A), (B) and (C).

6. A coating composition according to claim 1 wherein the copolymer has a number-average molecular weight of about 3,000 to about 200,000.

7. A coating composition according to claim 1 wherein the copolymer comprises about 10 to about 70% by weight of the coating composition.

8. A method for forming a coat for preventing adhesion of aquatic organisms, characterized by applying the coating composition of claim 1 to a substrate.

* * * * *